(12) United States Patent
Tani (10) Patent No.: US 7,108,118 B2
(45) Date of Patent: Sep. 19, 2006

(54) CENTRIFUGAL CLUTCH

(75) Inventor: Eiichiro Tani, Izumisano (JP)

(73) Assignee: Tani Hub Kogyo Co., Ltd., Osaka (JP)

( * ) Notice: Subject to any disclaimer, the term of this patent is extended or adjusted under 35 U.S.C. 154(b) by 158 days.

(21) Appl. No.: 10/903,549

(22) Filed: Jul. 30, 2004

(65) Prior Publication Data

US 2005/0029074 A1    Feb. 10, 2005

(30) Foreign Application Priority Data

Jul. 31, 2003    (JP) ................ 2003-205031

(51) Int. Cl.
*F16D 43/18*    (2006.01)
(52) U.S. Cl. .............................. 192/105 CD
(58) Field of Classification Search ........... 192/105 A, 192/105 C, 105 CE, 105 CD, 105 BA, 105 CP
See application file for complete search history.

(56) References Cited

U.S. PATENT DOCUMENTS

| | | | | |
|---|---|---|---|---|
| 2,588,482 | A * | 3/1952 | Chapman .............. | 192/105 CD |
| 2,970,680 | A * | 2/1961 | Cain .................... | 192/105 CD |
| 4,231,237 | A * | 11/1980 | Bochan ................ | 68/23.7 |
| 6,857,515 | B1 * | 2/2005 | Barron et al. ......... | 192/105 BA |

\* cited by examiner

*Primary Examiner*—Saul Rodriguez
(74) *Attorney, Agent, or Firm*—Koda & Androlia (57) ABSTRACT

A centrifugal clutch including arm members attached to the clutch shoes and the flange in a manner so as to freely pivot thereon, and weights provided on the front and rear sides of the respective clutch shoes in the rotation direction being made asymmetrical with each other relative to an installation position of the arm members in relation to the clutch shoes.

4 Claims, 6 Drawing Sheets

PRIOR ART

CENTRIFUGAL CLUTCH

BACKGROUND OF THE INVENTION

1. Field of the Invention

This present invention relates to a centrifugal clutch.

2. Description of the Related Art

Figure 5:
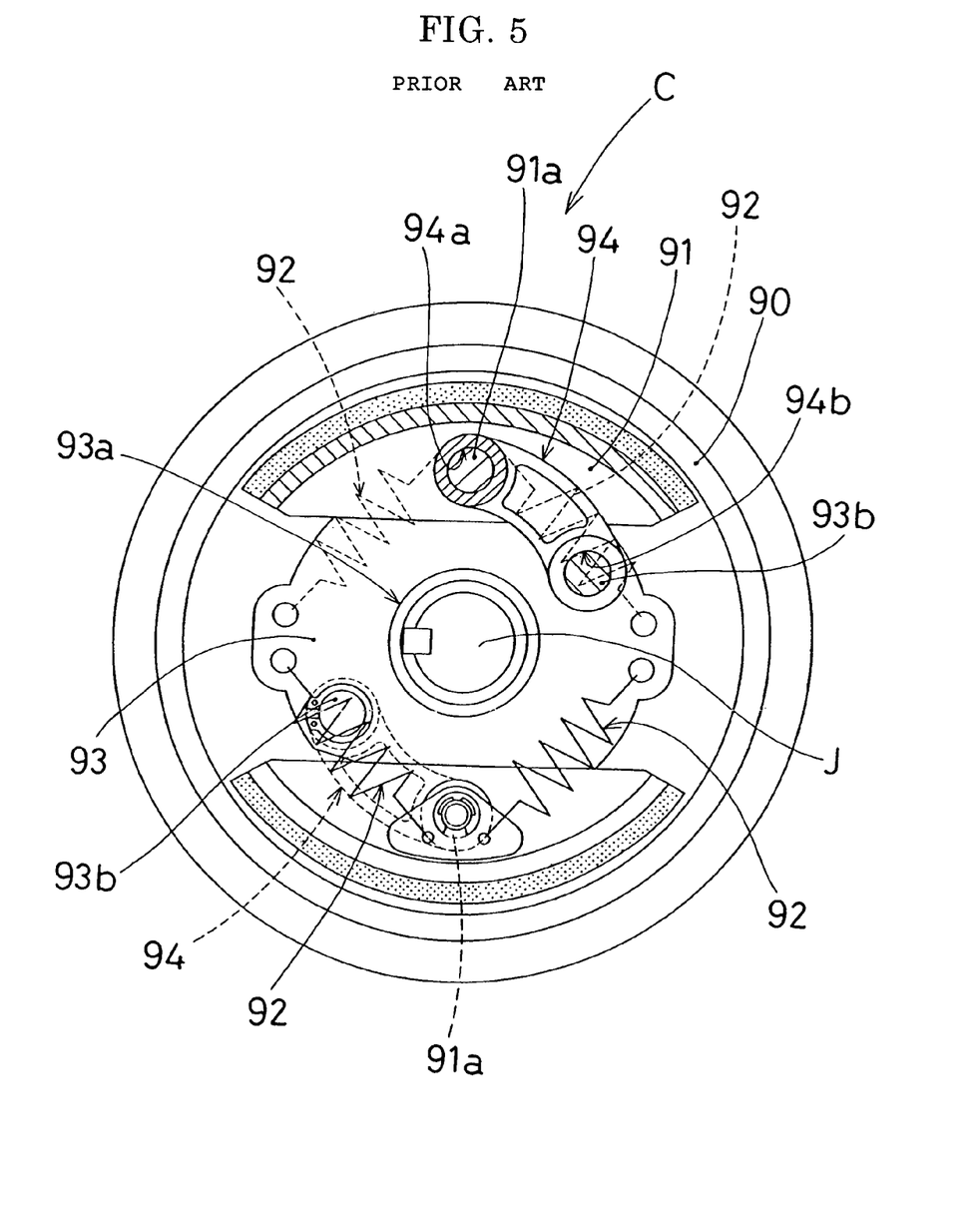
FIG. 5 is a partial cross-sectional view taken when a related-art centrifugal clutch is viewed from the front side.

As shown in FIG. 5, a centrifugal clutch C basically includes a clutch drum 90, a plurality of clutch shoes 91 that are placed in the clutch drum 90 so as to shift in the radial direction, and allowed to shift outward in the radial direction by centrifugal force to be frictionally engaged with the inner face of the clutch drum 90 (this means the two members are prevented from moving relatively by the friction) and springs 92 that pull the clutch shoes 91 inward in the radial direction in a biased manner to keep the clutch shoes 91 separated from the inner circumferential face of the clutch drum 90 in a normal state. As shown in FIG. 5, a flange plate 93 having a boss 93a that is rotated by a rotary shaft J is placed between the clutch shoes 91 inside the clutch drum 90; thus, pins 93b on the flange plate 93 side and pins 91a on the clutch shoe 91 side are inserted into holes 94b and holes 94a which are formed in both end portions of each of arm members 94 so that the arm members 94 are attached in a manner so as to freely rotate, with the springs 92 being laid between the flange plate 93 and each clutch shoe 91.

In this centrifugal clutch C, when the rotary shaft J has reached a rotational speed exceeding a predetermined level, the clutch shoes 91 are allowed to shift outward in the radial direction against spring force of the springs 92 so that the lining of each clutch shoe 91 is made in contact with the inner circumferential face of the clutch drum 90 and frictionally engaged therewith; thus, the clutch drum 90 is allowed to rotate integrally with the rotary shaft J. In contrast, when the rotational speed of the rotary shaft J becomes lower than the predetermined level, the clutch shoes 91 are shifted inward in the radial direction so that the lining of each clutch shoe 91 is released from the inner circumferential face of the clutch drum 90, with the result that the rotational force of the rotary shaft J is not transmitted to the clutch drum 90.

Other examples of this type of centrifugal clutch have been disclosed in Japanese Utility Model Application Publication Laid-Open No. 1-165339 (1988) and in Japanese Utility Model Application Publication Laid-Open No. 57-28937 (1982), and these have the same functions as the centrifugal clutch having the above-mentioned structure.

Figure 6:
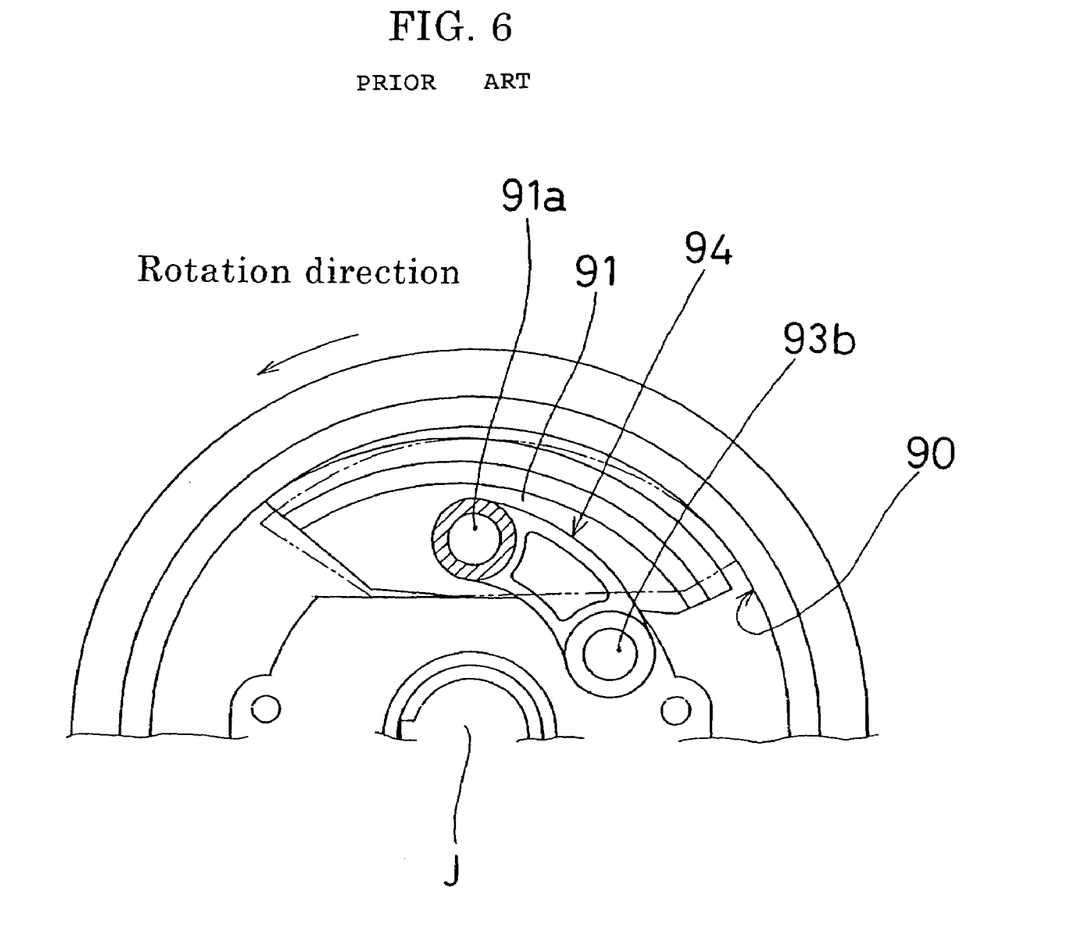
FIG. 6 is a drawing that explains problems of the conventional related-art centrifugal clutch.

However, the centrifugal clutch C shown in FIG. 5 has the following problems:

(1) Because of the structure in which the pins 93b on the flange plate 93 side and the pins 91a on the clutch shoe 91 side are respectively inserted into the holes 94b and holes 94a which are formed in both end portions of each of the arm members 94 so as to allow the arm members 94 to freely rock, before the lining of the clutch shoe 91 has been frictionally engaged with the inner circumferential face of the clutch drum 90, the front side in the rotation direction of the lining of each clutch shoe 91 collides with the clutch drum 90 (this is indicated by a solid line in FIG. 6) or the rear side in the rotation direction thereof collides with the clutch drum 90 (this is indicated by a two-dot chain line in FIG. 6) to generate continuous big collision noise.

(2) Since the tension and attaching position of each spring 92 are fixed, the lining of the outer face of each clutch shoe 91 wears out to make a gap between the lining and the inner circumferential face of the clutch drum 90 greater than the initial set value, with the result that a delay tends to occur in the timing at which the lining of each clutch shoe 91 is frictionally engaged with the inner circumferential face of the clutch drum 90.

SUMMARY OF THE INVENTION

It is, therefore, an object of the present invention to provide a centrifugal clutch which can suppress collision noise that is generated until the clutch shoes have been frictionally engaged with the clutch drum.

Moreover, it is another object of the present invention to provide a centrifugal clutch which can (1) suppress collision noise that is generated until the clutch shoes have been frictionally engaged with the clutch drum, and (2) hardly causes any delay in the timing at which the clutch shoes are frictionally engaged with the inner circumferential face of the clutch drum, even when the lining on the outer face of each clutch shoe has worn out.

The centrifugal clutch of the present invention includes a clutch drum; clutch shoes, each having an arc shape in a circumferential face, that are placed closely to an inner circumferential face of the clutch drum; a rotary shaft; a flange that is allowed to rotate integrally with the rotary shaft inside the clutch drum; arm members that couple the clutch shoes and the flange to each other; and springs that apply spring force to the respective clutch shoes toward the rotary shaft side, and the clutch shoes are allowed to shift toward the inner circumferential face of the clutch drum, as a rotational speed of the rotary shaft increases. The arm members are attached to the clutch shoes side and the flange side in a manner so as to freely pivot thereon, with weights of front and rear sides of the respective clutch shoes in a rotation direction being made asymmetrical with each other relative to an installation position of the arm members in relation to the clutch shoes.

The centrifugal clutch may further include holding plates, which are installed to relatively pivot on the rotary shaft around the rotary shaft, and two pairs of the springs, which are allowed to apply the spring force to the respective clutch shoes so as to pull in the rotary shaft direction, may be arranged so that one end of each of the springs is relatively attached to vicinity of outside edge of the holding plates.

In the centrifugal clutch of the present invention, with respect to weights of front and rear sides of the clutch shoes in the rotation direction, the weight on the rear side may be made greater than that on the front side, relative to installation position of the arm members in relation to the clutch shoes.

In the centrifugal clutch of the present invention, the respective arm members may have a branch portion and two arms which are two-way branched from the branch portion, with the branch portion being attached to the clutch shoes in a manner so as to freely pivot thereon, so that the respective ends of the arm portions on the front and rear sides in the rotation direction are respectively received by receiving pins that are formed on the flange.

The above and other objects, features and advantages of the centrifugal clutch of the present invention will become apparent from the following description read in conjunction with the accompanying drawings.

DESCRIPTION OF THE PREFERRED EMBODIMENTS

Referring to Figures, the following description will discuss embodiments of the present invention.

EMBODIMENT 1

Figure 1:
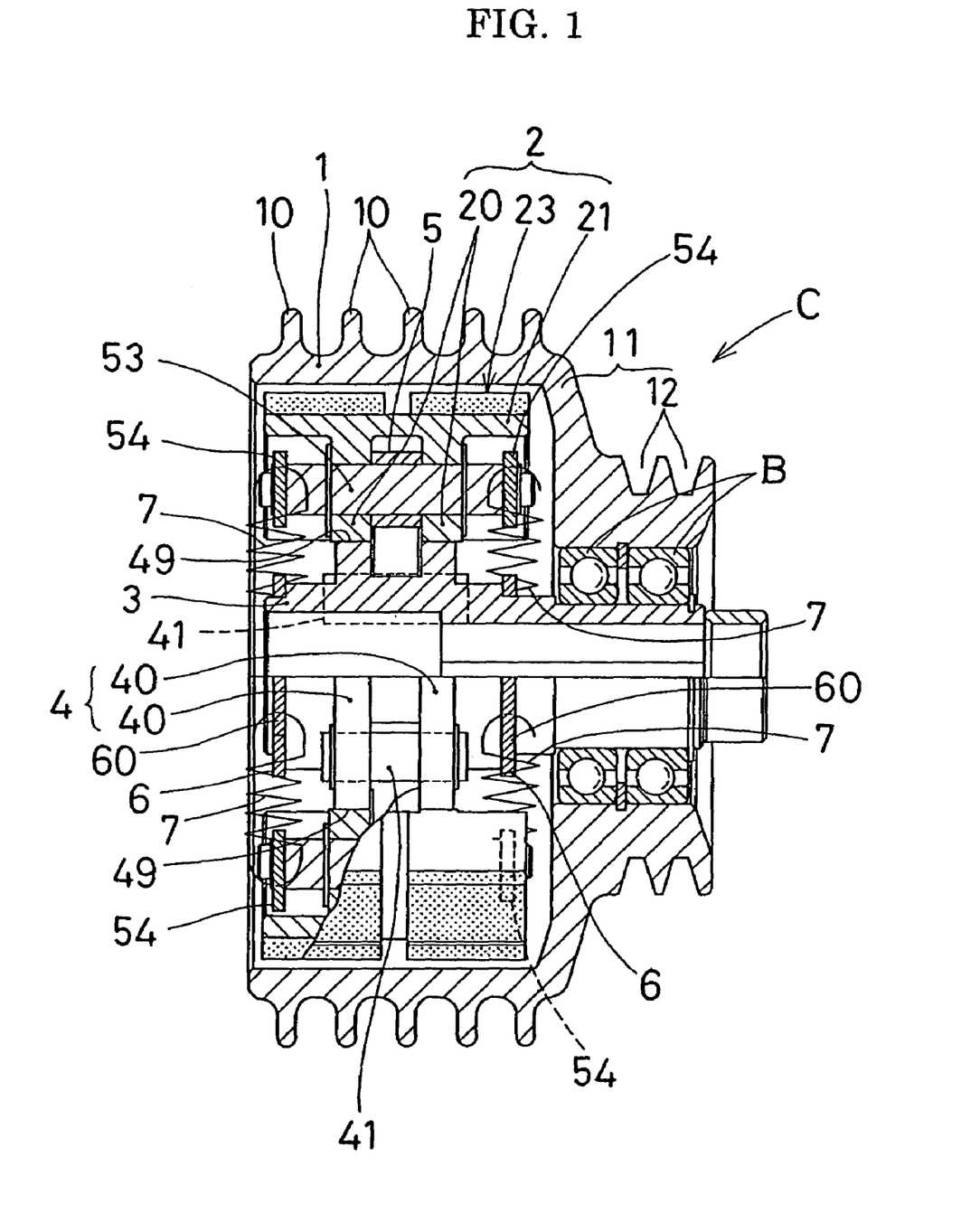
FIG. 1 is a cross-sectional view of a centrifugal clutch according to one embodiment of the present invention.
Figure 2:
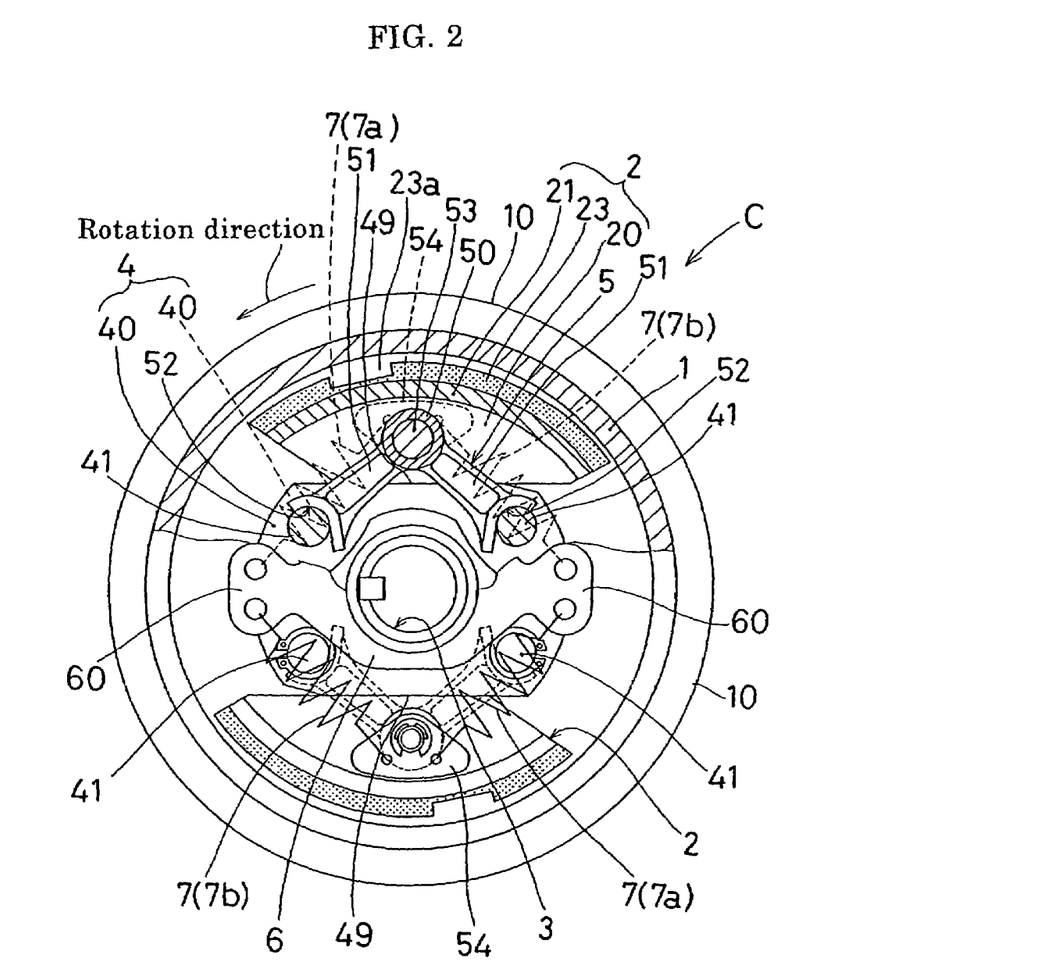
FIG. 2 is a partial cross-sectional view taken when the centrifugal clutch is viewed from the front side.

FIG. 1 is a longitudinal cross-sectional view that shows a centrifugal clutch C according to one embodiment of the present invention, and FIG. 2 is a partial cross-sectional view taken when the centrifugal clutch C is viewed from the front side.

(Basic Structure of Centrifugal Clutch C)

As shown in FIGS. 1 and 2, the centrifugal clutch C of the present invention includes a clutch drum 1, a pair of clutch shoes 2, each having an arc shape in its outer circumferential face, that are placed closely to the inner circumferential face of the clutch drum 1, a rotary shaft, a flange 4 that is allowed to rotate integrally with the rotary shaft 3 inside the clutch drum 1, arm members 5 that couple the clutch shoes 2 and the flange 4 to each other, and springs 7 that apply spring force to each clutch shoe 2 toward the rotary shaft 3 side. In this arrangement, as the rotational speed of the rotary shaft 3 increases, each clutch shoe 2 is allowed to shift toward the inner circumferential face of the clutch drum 1 against the spring force of the springs 7.

In the present embodiment, the centrifugal clutch C further includes holding plates 6 which are installed to relatively pivot on the rotary shaft 3 around the rotary shaft; and two pairs of springs 7, which are allowed to apply the spring force to each clutch shoe 2 so as to pull each clutch shoe 2 in the rotary shaft direction, are arranged so that one end of each spring 7 is respectively attached to the vicinity of the outside edge of each holding plate 6.

Moreover, as shown in FIGS. 1 and 2, one end of each arm member 5 is attached to each clutch shoe 2 with the other end being attached to the flange 4, in a manner so as to freely pivot thereon respectively.

The following description will discuss respective constituent members of this centrifugal clutch in detail.

(Specific Structure of Clutch Drum 1)

As shown in FIGS. 1 and 2, the clutch drum 1 is provided with a round-shaped space in the front view, which accommodates the clutch shoes 2, the rotary shaft 3, the flange 4, the arm members 5 and the springs 7, and a plurality of heat-radiating ribs 10 that are placed on the peripheral portion thereof. As shown in FIG. 1, in the clutch drum 1, an extended portion 11, having V-shaped grooves 12 on the outer circumferential portion thereof through which a V-shaped belt or a V-ribbed belt is laid, is installed consecutively. Also, bearings B for supporting the rotary shaft 3 are inserted into the inner circumferential portion of the extended portion 11.

(Specific Structure of Clutch Shoe 2)

As shown in FIGS. 1 and 2, each clutch shoe 2 has a T-letter shape in its cross-section formed by a pair of longitudinal members 20 and a lateral member 21, and the lateral member 21 is formed into an arc shape in the front view as shown in FIG. 2.

As shown in FIG. 2, a lining 23 made from carbide is formed on the outer circumferential face of the lateral member 21, and a groove 23a extending in the width direction is formed at a predetermined position in the circumferential direction of the lining 23. With this arrangement, the clutch shoes 2 in the present embodiment can release powder and the like of the carbide that have come off from the linings 23, from each contact face to the clutch drum 1; thus, it becomes possible (1) to greatly increase the braking torque (friction torque) to, for example, not less than 20%, (2) to reduce the decreasing degree of the braking torque due to a reduction of the frictional coefficient in a range of the actual frictional coefficient between the lining 23 and the inner circumferential face of the clutch drum 1, and (3) to disperse the contact pressure distribution of the linings 23 in the circumferential direction so that the durability of the linings 23 are improved.

Moreover, as shown in FIGS. 1 and 2, with respect to the front and rear sides of each clutch shoe 2 in the rotation direction, the weight of the rear side is made greater than the weight of the front side relative to the installation position of the arm member 5 through the pin 53 in relation to each clutch shoe 2; and in the present embodiment, this structure is achieved by cutting out one portion of the front side in the rotation direction of each clutch shoe 2.

(Specific Structure of Rotary Shaft 3)

As shown in FIGS. 1 and 2, the rotary shaft 3 has a cylinder shape (generally, referred to as boss) that is supported by the bearings B, and an output shaft of, for example, an engine, not shown in Figs., is inserted thereto, and secured therein by a key.

Not limited to the cylinder shape, this rotary shaft 3 may have a structure in which, for example, the output shaft of an engine is connected to the rotary shaft 3 through a coupling or the like.

(Specific Structure of Flange 4)

As shown in FIGS. 1 and 2, the flange 4, having two plate members 40, is arranged so that two plate members 40 protrude from the rotary shaft 3, and is allowed to rotate integrally with the rotary shaft 3 inside the clutch drum 1.

With respect to each of the plate members 40, as shown in FIGS. 1 and 2, pins 41 are attached to its four corners.

Moreover, the flange 4 is arranged so that the longitudinal members 20 of each clutch shoe 2 are received by linear end faces 49 of each of the plate members 40 shown in FIGS. 1 and 2; thus, in a non-rotation state of the rotary shaft 3, a predetermined gap is maintained between the lining 23 of each clutch shoe 2 and the clutch drum 1.

(Specific Structure of Arm Member 5)

Each arm member 5, which has a virtually V-letter shape as shown in FIG. 2, includes a branch portion 50 and arms 51 branching from the branch portion 50 as two portions. Here, the ends of each of the arms 51 are respectively provided with a receiving portion 52 which has a curved face.

As shown in FIGS. 1 and 2, each arm member 5 is attached to the clutch shoe 2 so as to freely pivot thereon, with each branch portion 50 being sandwiched by the longitudinal members 20, in a manner so as to allow each pin 53 to penetrate the longitudinal members 20 and the branch portion 50.

As shown in FIGS. 1 and 2, in the state in which the longitudinal members 20 of each clutch shoe 2 are received by the linear end faces 49 of each of the plate members 40, all the receiving portions 52 are made in contact with the receiving pins 41 and received by these pins.

Moreover, as shown in FIGS. 1 and 2, claw members 54 are secured to both ends of each pin 53.

(Specific Structure of Holding Plate 6)

As shown in FIGS. 1 and 2, two holding plates 6 are attached to the rotary shaft 3 in a manner so as to sandwich the flange 4 so that the holding plates 6 can relatively pivot on the rotary shaft 3. Protruding portions 60 are provided at the right and left ends of the holding plates 6, as shown in FIG. 2.

(Spring 7 and Specific Structure in its Attaching Mode)

Each of the springs 7 (springs 7*a*, 7*b*), which is an extension coil spring, is placed between one of the claw members 54 and one of the corresponding protruding portions 60 of each holding plate 6, as shown in FIGS. 1 and 2 so that the clutch shoe 2 are always pulled toward the rotary shaft 3. In other words, when the rotary shaft 3 is maintained in a non-rotation state, the linear end faces 49 of the plate members 40 are made in press-contact with the longitudinal members 20 of the clutch shoes 2 by the spring force of the springs 7.

Here, each spring 7 may be prepared not as an extension coil spring, but as a helical compression spring, when the principle of lever is utilized.

(Superior Functions of Centrifugal Clutch C)

Figure 3:
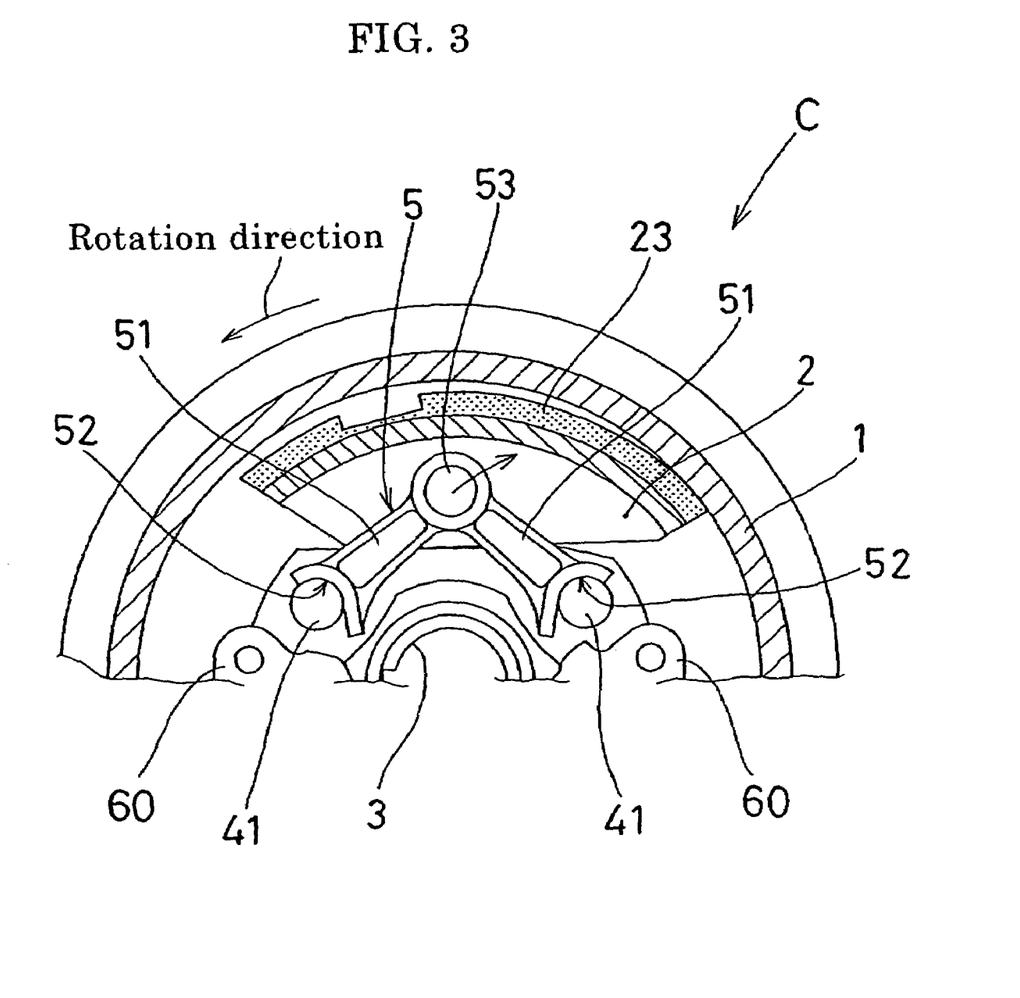
FIG. 3 is a partial cross-sectional view taken from the front side, which explains functions of the centrifugal clutch.

In this centrifugal clutch C, the rotary shaft 3 is rotated in the anticlockwise direction, and as the rotational speed increases, the receiving portion 52 of each arm 51 on the rear side in the rotation direction is made in press-contact with the receiving pin 41 on the same side so that the receiving portion 52 of each arm 51 on the front side in the rotation direction is slightly separated from the receiving pin 41 on the same side against the spring force of each spring 7. When the rotational speed of the rotary shaft 3 further increases to exceed a predetermined level, the lining 23 of each clutch shoe 2 comes closer to the inner circumferential face of the clutch drum 1 against the spring force of each spring 7*a*. Here, in this centrifugal clutch C, with respect to the front and rear sides of each clutch shoe 2 in the rotation direction, the weight of the rear side is made greater than the weight of the front side relative to the installation position of the arm member 5 through the pin 53 in relation to each clutch shoe 2; therefore, simultaneously as the lining 23 of each clutch shoe 2 comes closer to the inner circumferential face of the clutch drum 1, the rear side in the rotation direction of each lining 23 is first always made in contact with the inner face of the clutch drum 1, as shown in FIG. 3. Further, with this state being maintained, the receiving portion 52 of each arm 51 on the front side in the rotation direction is greatly separated from the receiving pin 41 on the same side so that the lining 23 of each clutch shoe 2 is frictionally engaged with the inner circumferential face of the clutch drum 1. In other words, the rotational force of the rotary shaft 3 is transmitted to the clutch drum 1.

As described above, as the rotation of the rotary shaft 3 becomes greater, the rear side in the rotation direction of each lining 23 is always made in contact with the inner face of the clutch drum 1; therefore, different from the centrifugal clutch described in the prior art section, it becomes possible to prevent big collision noise from occurring continuously.

Even in the case of the reversed rotation direction of the rotary shaft 3, the same effects can be achieved based upon the same principle.

As described above, when the rotational speed of the rotary shaft 3 further increases to exceed the predetermined level, the receiving portion 52 of each arm 51 is separated from the receiving pin 41 on the front side in the rotation direction against the spring force of the spring 7*a* so that the lining 23 of each clutch shoe 2 comes closer to the inner circumferential face of the clutch drum 1.

In the case of the conventional centrifugal clutch described in the related-art section, the tension of each spring 92 and its attaching position are fixed; therefore, when the lining of the outer face of each clutch shoe 91 has worn out to make the gap to the inner circumferential face of the clutch drum 90 greater than the initial set value, a delay tends to occur in the timing at which the lining of each clutch shoe 91 is frictionally engaged with the inner circumferential face of the clutch drum 90.

In the centrifugal clutch C in accordance with the present embodiment, however, the holding plates 6 are made freely pivotable on the rotary shaft 3 so that, even when each lining 23 has worn out to make the elongation degree of each spring 7*a* greater, the holding plates 6 are allowed to pivot slightly in the clockwise direction against the spring force of each spring 7*b* to compensate for the extra elongated portion; thus, even when the lining 23 of each clutch shoe 2 has worn out, hardly any delay occurs in the timing at which the lining 23 of each clutch shoe 2 is frictionally engaged with the inner circumferential face of the clutch drum 1.

Even in the case of the reversed rotation direction of the rotary shaft 3, the same effects can be achieved based upon the same principle.

EMBODIMENT 2

Figure 4:
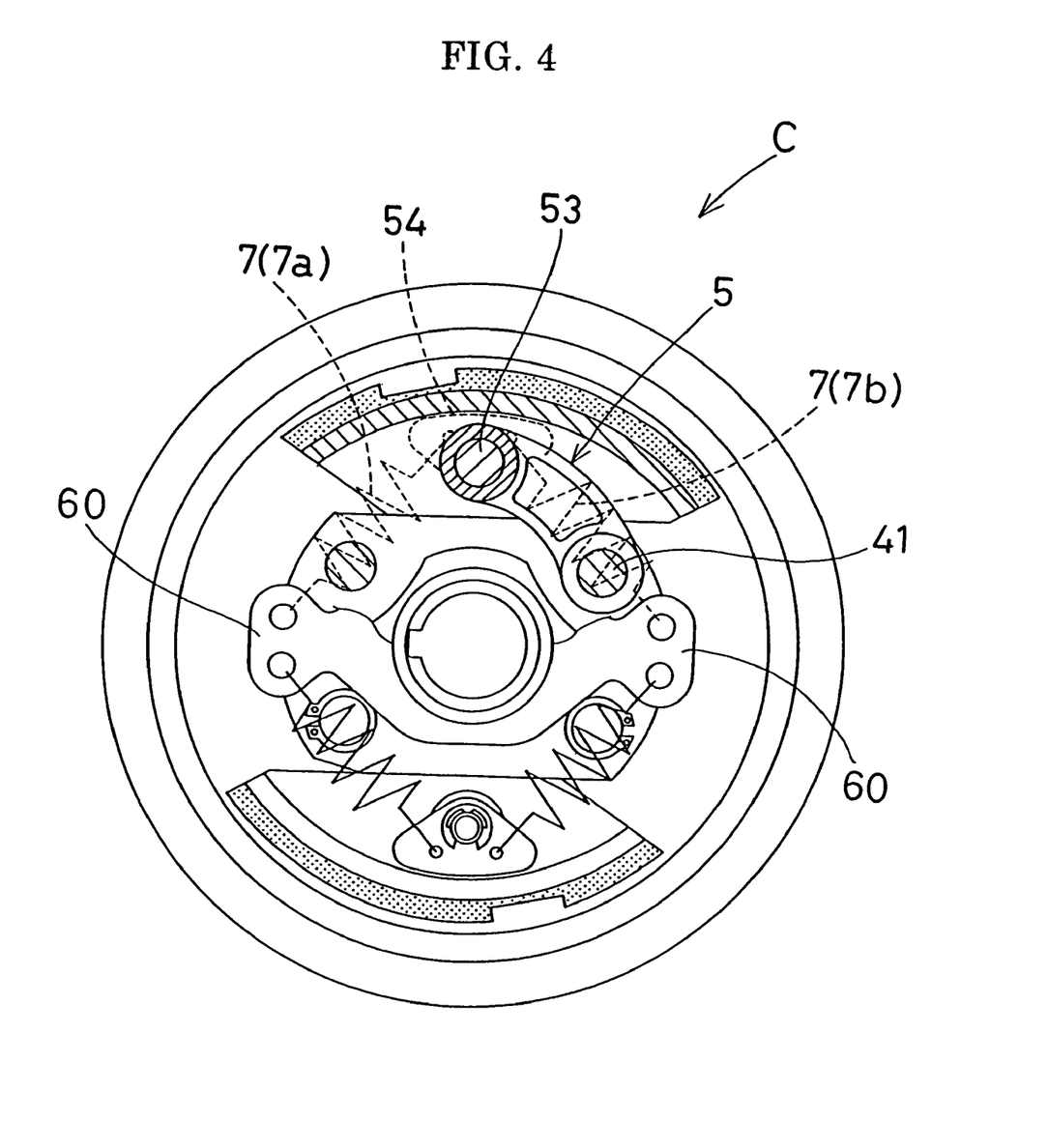
FIG. 4 is a partial cross-sectional view taken when the centrifugal clutch is viewed from the front side, according to another embodiment of the present invention.

In the above-mentioned embodiment 1, the two-way arm members 5 are used; however, not limited to this arrangement, for example, arm members 5 as shown in FIG. 4 may be used as long as they are used for any centrifugal clutch that allows only the one-way rotation.

Moreover, in the case when no consideration needs to be given to the worn-out linings 23, the holding plates 6 may be relatively nonpivotable on the rotary shaft 3, and the holding plates 6 may have an integral structure with the flange 4 (a structure in which the protruding portions 60 are formed on the flange 4).

The present invention having the above-mentioned arrangement makes it possible to provide the following effects:

Based upon the contents described in the section of the detailed description of the invention, it becomes possible to provide a centrifugal clutch which can suppress collision noise that is generated until the clutch shoes have been frictionally engaged with the clutch drum.

Moreover, based upon the contents described in the section of the detailed description of the invention, it becomes possible to provide a centrifugal clutch which can (1) suppress collision noise that is generated until the clutch shoes have been frictionally engaged with the clutch drum, and (2) hardly causes any delay in the timing at which the lining of each clutch shoe is frictionally engaged with the inner circumferential face of the clutch drum, even when the lining on the outer face of each clutch shoe has worn out.

What is claimed is:

1. A centrifugal clutch comprising:

a clutch drum;

clutch shoes, each having an arc shape in a circumferential face, that are placed closely to an inner circumferential face of the clutch drum;

a rotary shaft;

a flange that is allowed to rotate integrally with the rotary shaft inside the clutch drum;

arm members that couple the clutch shoes and the flange to each other; and springs that apply spring force to the respective clutch shoes toward the rotary shaft side, wherein:

the clutch shoes are allowed to shift toward the inner circumferential face of the clutch drum, as a rotational speed of the rotary shaft increases, the arm members are attached to the clutch shoes side and the flange side in a manner so as to freely pivot thereon, with weights of front and rear sides of the respective clutch shoes in a rotation direction being made asymmetrical with each other relative to an installation position of the arm members in relation to the clutch shoes; and with respect to weights of front and rear sides of the clutch shoes in the rotation direction, the weight on the rear side is made greater than that on the front side, relative to installation position of the arm members in relation to the clutch shoes.

2. The centrifugal clutch according to claim 1, further comprising holding plates, which are installed to relatively pivot on the rotary shaft around the rotary shaft, wherein two pairs of the springs, which are allowed to apply the spring force to the respective clutch shoes so as to pull in a rotary shaft direction, are arranged so that one end of each of the springs is relatively attached to vicinity of outside edge of the holding plates.

3. The centrifugal clutch according to claim 1, wherein the respective arm members have a branch portion and two arms which are two-way branched from the branch portion, with the branch portion being attached to the clutch shoes in a manner so as to freely pivot thereon, so that the respective ends of the arm portions on the front and rear sides in the rotation direction are respectively received by receiving pins that are formed on the flange.

4. The centrifugal clutch according to claim 2, wherein the respective arm members have a branch portion and two arms which are two-way branched from the branch portion, with the branch portion being attached to the clutch shoes in a manner so as to freely pivot thereon, so that the respective ends of the arm portions on the front and rear sides in the rotation direction are respectively received by receiving pins that are formed on the flange.

* * * * *